US010673610B2

(12) United States Patent
Vigilant et al.

(10) Patent No.: US 10,673,610 B2
(45) Date of Patent: Jun. 2, 2020

(54) SYSTEM AND METHOD FOR PROTECTING A CRYPTOGRAPHIC DEVICE AGAINST FAULT ATTACKS WHILE PERFORMING CRYPTOGRAPHIC NON-LINEAR OPERATIONS USING LINEAR ERROR CORRECTING CODES

(71) Applicant: GEMALTO SA, Meudon (FR)

(72) Inventors: David Vigilant, Meudon (FR); Sabine Azzi, Meudon (LB)

(73) Assignee: THALES DIS FRANCE SA, Meudon (FR)

( * ) Notice: Subject to any disclaimer, the term of this patent is extended or adjusted under 35 U.S.C. 154(b) by 208 days.

(21) Appl. No.: 15/578,033

(22) PCT Filed: May 27, 2016

(86) PCT No.: PCT/EP2016/061980
§ 371 (c)(1),
(2) Date: Nov. 29, 2017

(87) PCT Pub. No.: WO2016/193139
PCT Pub. Date: Dec. 8, 2016

(65) Prior Publication Data
US 2018/0123778 A1    May 3, 2018

(30) Foreign Application Priority Data
May 29, 2015 (EP) .................................... 15305821

(51) Int. Cl.
*H04L 9/00* (2006.01)
*H04L 9/06* (2006.01)
(Continued)

(52) U.S. Cl.
CPC ............ *H04L 9/004* (2013.01); *H04L 9/0631* (2013.01); *H04L 9/14* (2013.01); *H04L 9/3226* (2013.01);
(Continued)

(58) Field of Classification Search
CPC ......... H04L 9/003; H04L 9/304; H03M 13/13
(Continued)

(56) References Cited

U.S. PATENT DOCUMENTS

2012/0072737 A1*   3/2012   Schrijen .................. H04L 9/304
                                                        713/189
2012/0198302 A1*   8/2012   Otterstedt ............. H03M 13/13
                                                        714/755
(Continued)

OTHER PUBLICATIONS

Julien Bringer et al: "Orthogonal Direct Sum Masking: A Smartcard Friendly Computation Paradigm in a Code, with Builtin Protection against Side-Channel and Fault Attacks", International Association for Cryptologic Research,, vol. 20140828:234222, (Aug. 29, 2014), pp. 1-19, XP061016844, cited in the application Sections 2 and 3.
(Continued)

*Primary Examiner* — Bryan F Wright
(74) *Attorney, Agent, or Firm* — The Jansson Firm; Pehr B. Jansson

(57) ABSTRACT

A system, method and computer-readable storage medium with instructions for protecting an electronic device against fault attack. Given a data represented as an input codeword of a systematic linear error correcting code, the technology provides the secure computation of the output codeword corresponding to the result of the non-linear function applied to this data. Other systems and methods are disclosed.

20 Claims, 11 Drawing Sheets

(51) Int. Cl.
*H04L 9/14* (2006.01)
*H04L 9/32* (2006.01)
*H04L 9/30* (2006.01)
*H03M 13/13* (2006.01)

(52) U.S. Cl.
CPC ............ *H03M 13/13* (2013.01); *H04L 9/304* (2013.01); *H04L 2209/34* (2013.01)

(58) Field of Classification Search
USPC ........................................................ 713/189
See application file for complete search history.

(56) References Cited

U.S. PATENT DOCUMENTS

| | | | | |
|---|---|---|---|---|
| 2015/0270967 A1* | 9/2015 | Susella | ................ | H04L 9/3093 380/30 |
| 2015/0280906 A1* | 10/2015 | Shany | .................... | H04L 9/004 380/29 |
| 2016/0012237 A1* | 1/2016 | Eftekhari | ................ | H04L 9/004 713/189 |
| 2017/0141911 A1* | 5/2017 | Michiels | ................ | H04L 9/003 |

OTHER PUBLICATIONS

PCT/EP2016/061980,International Search Report, dated Jul. 18, 2016, European Patent Office, P.B. 5818 Patentlaan 2 N—2280 HV Rijswijk.

PCT/EP2016/061980,Written Opinion of the International Searching Authority, dated Jul. 18, 2016, European Patent Office, D-80298 Munich.

Tal G. Malkin et al: "A Comparative Cost/Security Analysis of Fault Attack Countermeasures", (Jan. 1, 2006), =Fault Diagnosis and Tolerance in Cryptography Lecture Notes in Computer Science;;LNCS, Springer, Berlin, DE, pp. 159-172, XP019045559, ISBN: 978-3-540-46250-7 cited in the application, the whole document.

Karpovsky M et al: "Robust protection against fault-injection attacks on smart cards implementing the advanced encryption standard", Dependable Systems and Networks, 2004 International Conference on Florence, Italy Jun. 28-Jul. 1, 2004, Piscataway, NJ, USA, IEEE, (Jun. 28, 2004), pp. 82-90, XP010710793, DOI: 10.1109/DSN.2004.1311880 ISBN: 978-0-7695-2052-0 cited in the application, the whole document.

* cited by examiner

Example Table 602

```
BYTE T0_C_16_8_5[256] =
{
0x00, 0xd1, 0xa3, 0x72, 0x47, 0x96, 0xe4, 0x35, 0x8e, 0x5f, 0x2d, 0xfc
0xc9, 0x18, 0x6a, 0xbb, 0x1d, 0xcc, 0xbe, 0x6f, 0x5a, 0x8b, 0xf9, 0x28
0x93, 0x42, 0x30, 0xe1, 0xd4, 0x05, 0x77, 0xa6, 0x3a, 0xeb, 0x99, 0x48
0x7d, 0xac, 0xde, 0x0f, 0xb4, 0x65, 0x17, 0xc6, 0xf3, 0x22, 0x50, 0x81
0x27, 0xf6, 0x84, 0x55, 0x60, 0xb1, 0xc3, 0x12, 0xa9, 0x78, 0x0a, 0xdb
0xee, 0x3f, 0x4d, 0x9c, 0x74, 0xa5, 0xd7, 0x06, 0x33, 0xe2, 0x90, 0x41
0xfa, 0x2b, 0x59, 0x88, 0xbd, 0x6c, 0x1e, 0xcf, 0x69, 0xb8, 0xca, 0x1b
0x2e, 0xff, 0x8d, 0x5c, 0xe7, 0x36, 0x44, 0x95, 0xa0, 0x71, 0x03, 0xd2
0x4e, 0x9f, 0xed, 0x3c, 0xc9, 0xd8, 0xaa, 0x7b, 0xc0, 0x11, 0x63, 0xb2
0x87, 0x56, 0x24, 0xf5, 0x53, 0x82, 0xf0, 0x21, 0x14, 0xc5, 0xb7, 0x66
0xdd, 0x0c, 0x7e, 0xaf, 0x9a, 0x4b, 0x39, 0xe8, 0xe8, 0x39, 0x4b, 0x9a
0xaf, 0x7e, 0x0c, 0xdd, 0x66, 0xb7, 0xc5, 0x14, 0x21, 0xf0, 0x82, 0x53
0xf5, 0x24, 0x56, 0x87, 0xb2, 0x63, 0x11, 0xc0, 0x7b, 0xaa, 0xd8, 0xc9
0x3c, 0xed, 0x9f, 0x4e, 0xd2, 0x03, 0x71, 0xa0, 0x95, 0x44, 0x36, 0xe7
0x5c, 0x8d, 0xff, 0x2e, 0x1b, 0xca, 0xb8, 0x69, 0xcf, 0x1e, 0x6c, 0xbd
0x88, 0x59, 0x2b, 0xfa, 0x41, 0x90, 0xe2, 0x33, 0x06, 0xd7, 0xa5, 0x74
0x9c, 0x4d, 0x3f, 0xee, 0xdb, 0x0a, 0x78, 0xa9, 0x12, 0xc3, 0xb1, 0x60
0x55, 0x84, 0xf6, 0x27, 0x81, 0x50, 0x22, 0xf3, 0xc6, 0x17, 0x65, 0xb4
0x0f, 0xde, 0xac, 0x7d, 0x48, 0x99, 0xeb, 0x3a, 0xa6, 0x77, 0x05, 0xd4
0xe1, 0x30, 0x42, 0x93, 0x28, 0xf9, 0x8b, 0x5a, 0x6f, 0xbe, 0xcc, 0x1d
0xbb, 0x6a, 0x18, 0xc9, 0xfc, 0x2d, 0x5f, 0x8e, 0x35, 0xe4, 0x96, 0x47
0x72, 0xa3, 0xd1, 0x00};
```

*Fig. 7*

Example Table T2 614

```
BYTE T2[256]= (in hexadecimal)
{0x3c, 0xfc, 0x0f, 0x2d, 0xac, 0x11, 0xd2, 0xb1,
0x74, 0xa3, 0x99, 0x95, 0x42, 0xb1, 0x56, 0x0f,
0x77, 0x2d, 0xfa, 0x65, 0x48, 0xb4, 0xe1, 0x47,
0x95, 0x6f, 0xfa, 0xb8, 0x7e, 0xaa, 0xa5, 0xd4,
0xaa, 0xd4, 0xb4, 0xb8, 0xf3, 0xd8, 0x99, 0x7b,
0x55, 0x8d, 0x71, 0xd2, 0xbd, 0x50, 0x81, 0x33,
0xe8, 0x2b, 0x0a, 0xcc, 0x5f, 0x05, 0x00, 0xcc,
0x14, 0x1b, 0x18, 0xee, 0xf0, 0x30, 0xe7, 0xbb,
0xa0, 0xbe, 0x41, 0x18, 0x4d, 0x30, 0x77, 0xc9,
0xbe, 0xd7, 0x4e, 0x21, 0x44, 0x8d, 0x96, 0x39,
0x81, 0x53, 0x53, 0xff, 0x93, 0x1b, 0xd1, 0x66,
0xfc, 0xc3, 0x28, 0xc6, 0xe2, 0xe7, 0x2e, 0x47,
0x56, 0xdd, 0xdb, 0x6a, 0x2e, 0x4e, 0xee, 0x63,
0x84, 0xf0, 0x7e, 0xde, 0x22, 0x06, 0x78, 0x60,
0x03, 0xaf, 0xa6, 0x6c, 0xb2, 0x2b, 0x5c, 0xe1,
0xe4, 0xc0, 0x3a, 0x14, 0x4b, 0x71, 0xf6, 0x93,
0xaf, 0x4d, 0x74, 0xf6, 0x11, 0xed, 0x27, 0xf5,
0x8b, 0x9c, 0x33, 0xca, 0xdd, 0x27, 0xcf, 0xff,
0x7d, 0x35, 0x5a, 0xb2, 0x0c, 0xf3, 0x35, 0x22,
0x00, 0x88, 0x5c, 0x03, 0x60, 0x1e, 0x36, 0x3f,
0xeb, 0x66, 0x84, 0xc5, 0x82, 0x06, 0x90, 0x24,
0xe2, 0xd7, 0x72, 0xa6, 0xc3, 0x09, 0x8b, 0x12,
0xed, 0xf9, 0xca, 0x5f, 0xb7, 0x39, 0x48, 0x24,
0xc9, 0x9c, 0xd8, 0x87, 0xbb, 0x6c, 0x88, 0x63,
0x09, 0xa9, 0x72, 0xbd, 0xcf, 0xd1, 0x0c, 0xa9,
0x3c, 0x6f, 0xa3, 0x8e, 0x55, 0xa5, 0x78, 0x36,
0x9a, 0x7d, 0x5a, 0x0a, 0xeb, 0xde, 0x44, 0x9f,
0x42, 0xe8, 0x28, 0x1e, 0x21, 0x4b, 0x12, 0x82,
0x05, 0xe4, 0xf5, 0x90, 0x9a, 0x9f, 0x1d, 0x7b,
0xc5, 0x50, 0xb7, 0x69, 0x17, 0x6a, 0xdb, 0x41,
0x59, 0x65, 0x3a, 0xa0, 0x3f, 0x96, 0x17, 0xc6,
0x8e, 0x87, 0x69, 0xc0, 0x59, 0xac, 0x1d, 0xf9}
```

*Fig. 12*

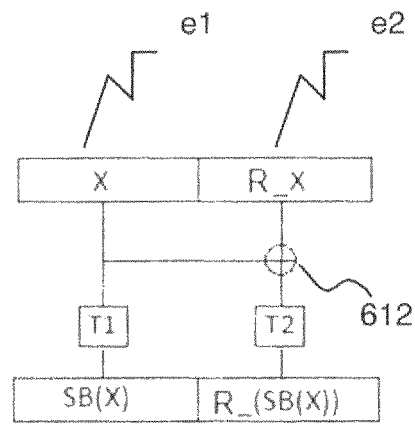
Fig. 13
Fig. 14
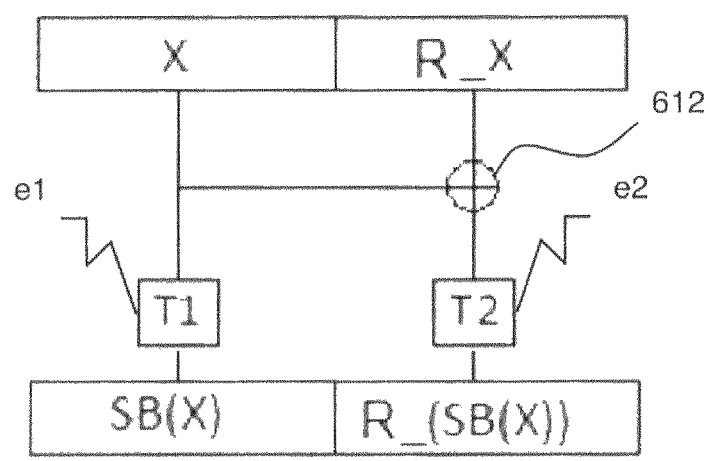

SYSTEM AND METHOD FOR PROTECTING A CRYPTOGRAPHIC DEVICE AGAINST FAULT ATTACKS WHILE PERFORMING CRYPTOGRAPHIC NON-LINEAR OPERATIONS USING LINEAR ERROR CORRECTING CODES

BACKGROUND OF THE INVENTION

The present invention relates generally to electronic cryptography technology, and in particular to protecting a cryptography device against fault attacks by using linear error correcting codes to determine whether any input, output or intermediate result, involved in performing a cryptographic operations, especially non linear operations such as the SubBytes operation (in case of the AES), has been subjected to a fault attack.

Electronic communication and commerce can be powerful yet dangerous tools. With the wide-spread availability of network technology, such as the Internet, there is an ever increasing use of online tools for communication and commerce. Every year more users find it easier or quicker to conduct important transactions, whether in the form of correspondence or commerce, using computers and computer networks. However, there is always the risk that the security of electronic transactions is compromised through interception by third parties who do not have the right to partake in the transactions. When malicious third parties obtain access to otherwise private transactions and data there is risk of economic loss, privacy loss, and even loss of physical safety. Cryptography is one mechanism employed to avoid intrusion into the privacy of electronic transactions and data.

Cryptography is a technology for hiding a message in the presence of third parties using mathematical techniques in which a message is encrypted in such a way that it can only be decrypted using a secret key that should only be known by the recipient and/or sender of a message.

While cryptographic processes are often complex algorithms and the details thereof are outside the scope of this document. However, at their core cryptographic operations involve repeated combinations of specific substeps that are referred to herein as cryptographic operations. For example, the Advanced Encryption Standard (AES), which serves as an example herein, involves encrypting (or decrypting) a message by performing a sequence of cycles called rounds. Each round operates on a matrix of bytes called a state. Each of the rounds (except for the first round) includes a non-linear operation called SubBytes in which an input byte from the state is substituted with an output byte based on a substitution box (SBox). AES also includes another non-linear step referred to as MixColumns operation. AES is described in Joan Daemen, Vincent Rijmen, *The Design of Rijndael: AES—The Advanced Encryption Standard*, Springer, 2002.

In a typical software implementation, and for performance reasons, SubBytes is implemented as a lookup table (SBox). In the same way, MixColumns may also benefits from a lookup table representing the polynomial multiplication by x (the so-called XTime operation).

When there is a reason to protect the secrecy of some information, unfortunately, there is a corresponding threat that some unauthorized third party seeks to break that secrecy. One attack mechanism is the so-called Side-channel attacks, which make use of the program timing, power consumption and/or the electronic emanation of a device that performs a cryptographic computation. The behavior of the device (timing, power consumption and electronic emanation) varies and depends directly on the program and on the data manipulated in the cryptographic algorithm. An attacker could take advantage of these variations to infer sensitive data leading to the recovery of a secret key.

Another attack mechanism is the so-called Fault attacks. Fault attacks derive their name from the practice of creating a fault during the computation and exploiting the result produced by that fault to deduce the secret key. Generally, injecting a fault requires a prior step that consists of determining the most likely successful moment for the fault injection. This prior step is usually done by reverse engineering the program through studying the power or the electronic emanation trace. Table lookup operations are particularly vulnerable to fault attacks and can allow the intruder to deduce a secret key, whichever fault effect is caused.

One mechanism used to defend against fault attacks is referred to as Time Redundancy. This includes performing cryptographic operations twice to ensure that no fault has been introduced during the computation by comparing the results of the two computations. Doing operations twice is a costly countermeasure. Time Redundancy is described in T. G. Malkin, et al., *A Comparitive Cost/Security Analysis of Fault Attack Countermeasures*, Workshop on Fault Detection and Tolerance in Cryptography, August 2005, http://conferenze.dei.polimi.it/FDTC05/Standaert %20-20publisheable.pdf (Accessed May 21, 2005).

Satoh et al. describe the hybrid redundancy, a technique that defends against fault attacks by performing the backward computation of an operation. Akashi Satoh, et al., *High-performance Concurrent Error Detection Scheme for AES Hardware, Cryptographic Hardware and Embedded Systems—CHES* 2008: $10^{th}$ International Workshop Lecture Notes in Computer Science Volume 5154, 2008, pp 100-112. Springer.

Another defense mechanism against fault attacks is Information Redundancy. A simple example of information redundancy is parity checking. Information redundancy countermeasures involve the use of error correcting codes. The latter is described in M. G. Karpovsky et al., *Robust protection against fault-injection attacks on smart cards implementing the advanced encryption standard*, 2004 International Conference on Dependable Systems and Networks. IEEE.

One recent information redundancy mechanisms based on linear codes looks promising for software implementations. Indeed Bringer et al. proposed a masking scheme to thwart both side-channel and fault attacks (Julien Bringer et al., *Orthogonal Direct Sum Masking—A Smartcard Friendly Computation Paradigm in a Code, with Builtin Protection against Side-Channel and Fault Attacks*, WISTP 2014, https://eprint.iacr.org/2014/665 (accessed on May 26, 2015). However, non-linear operations may be vulnerable to fault attack. In fact, the properties of information redundancy are used before and after the non-linear operation but not during the operation itself, which creates a potential security gap. So far, there is no existing solution based on linear error correcting code that protects globally the whole cryptographic algorithm (both linear and non-linear operations) against fault attacks.

While information redundancy using error-correcting codes provides a useful mechanism for detecting potential injection of a fault into computation values of cryptographic operations, it has hitherto proven difficult to implement such countermeasures efficiently on small devices because to be powerful error detectors the data size of such computation values has to be increased. For example, a C[16,8,5] code doubles the data size from 8-bits to 16-bits. Many cryptographic operations are performed using lookup tables. Lookup tables on 16-bits require approximately 65,000 entries, which is prohibitively large for storing on many constrained cryptographic devices such as smart cards and embedded devices.

From the foregoing it will be apparent that there is still a need for an improved technology to provide a secure mechanism that is computationally efficient, that does not require excessively large storage, and in which a portable security device—e.g., a smart card connected to a host computer—can provide the capability of providing cryptographic services that are protected from fault attacks.

BRIEF DESCRIPTION OF THE DRAWINGS

FIG. 7 is an example lookup table for a C[16,8,5] linear error correcting code.

FIG. 12 is an illustration of an example of the table T2 of FIG. 6 for providing the redundancy portion R_f(x) corresponding to the result of the cryptographic operation f which in this case is the SubBytes of the AES and considering also the error correcting code C[16,8,5].

FIGS. 13 and 14 are illustrations of fault attacks, which may be thwarted by the countermeasure technique of FIGS. 5 and 6.

DETAILED DESCRIPTION OF THE INVENTION

Figure 1:
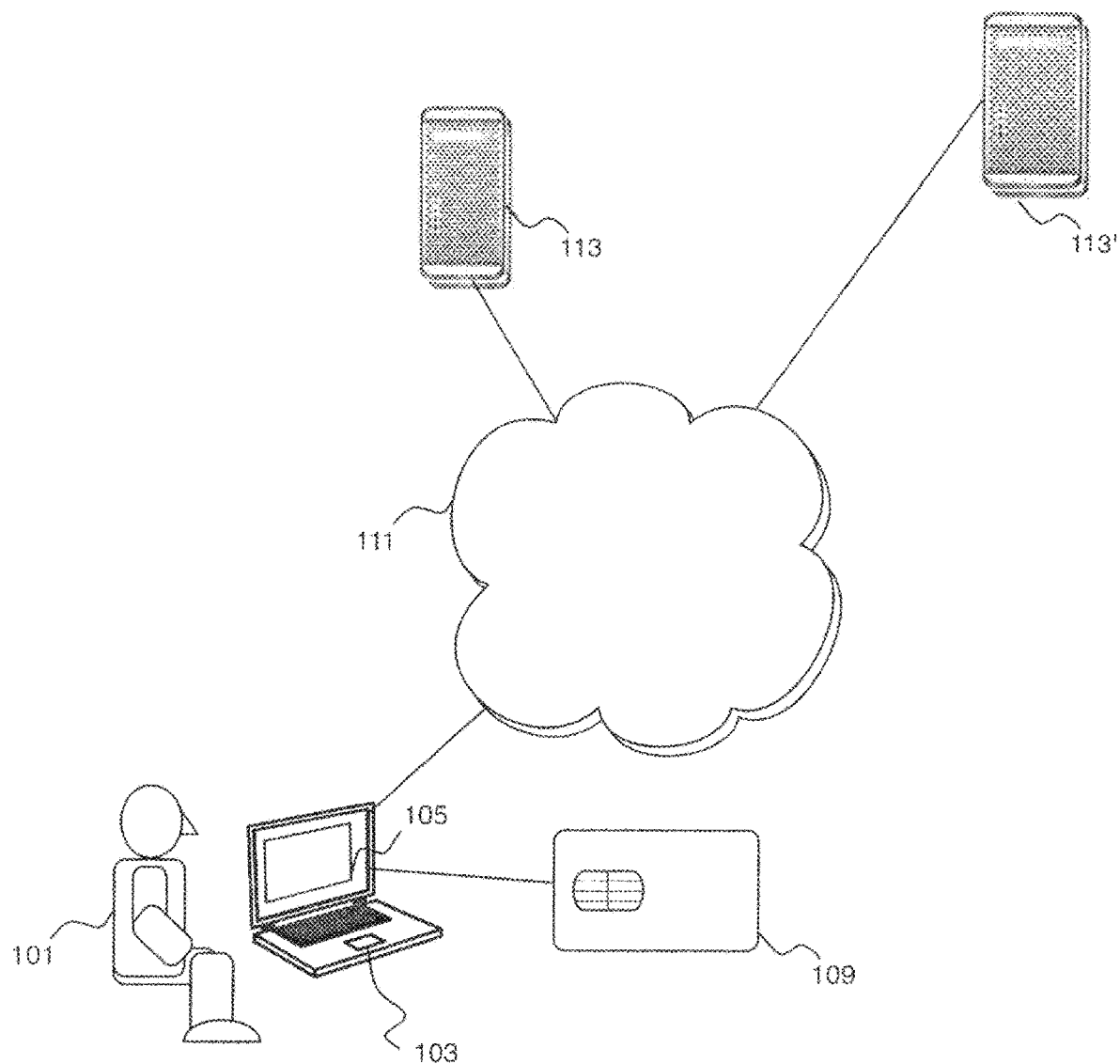
FIG. 1 is a schematic illustration of a host computer with a portable security device, e.g., a smart card, connected thereto for performing cryptographic services through connection over a network to one or more servers.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present technology provides a mechanism for protecting non-linear step of cryptographic operations with linear error correcting codes, filling the gap of the prior art. In an embodiment of the invention, a technology is provided that protects cryptographic devices, for example, smart cards, or other portable security devices, against fault attacks when these cryptographic devices perform cryptographic non-linear operations such as SubBytes and XTime that are particularly vulnerable to fault attacks.

Smart cards are plastic cards with an embedded microprocessor and a secure storage. They are portable, secure, and tamper-resistant. Smart cards provide security services in many domains including telecommunication, banking, commerce, and citizen identity. Smart cards can take different forms, such as credit card shaped cards with electrical connectors to connect the smart card to a smart card reader, USB tokens with embedded smart cards, and SIM cards for use in mobile telephones and tablet devices. Smart cards are used herein as examples of portable security devices that may be used in implementations of the technology described herein. Other examples of portable security devices include smart memory cards, flash memory, etc. In a preferred embodiment, the portable security device has a processor, a memory for storing programs and data, and some security features to make the device relatively tamper-proof. Smart cards are used herein as examples of such devices.

While the mechanism for masking a cryptographic calculation described herein may be used advantageously in smart cards and other portable security tokens used for performing cryptographic calculations, the same mechanisms may also be used with other cryptographic processors including full-sized personal computers and network servers. Thus, smart cards are used herein for illustrative purposes only.

Cryptographic calculations are some of the more important functions that smart cards provide. The smart card stores private or shared secret keys in its secure storage and performs cryptographic operations, for example, to encrypt or to decrypt a given input. A smart card works with a host device, such as a personal computer (PC), cell phone, tablet device or banking terminal. A PC application, such as an email client or a web browser, typically works with a smart card to sign, encrypt, or decrypt a document. The cryptographic operation may be part of a challenge-response mechanism for user authentication. The PC application and the smart card interact through some cryptographic API called middleware, which is designed to communicate with the smart card. In this scenario, the smart card provides services locally to the PC.

FIG. 1 is a schematic illustration of a network 111 connecting a host computer 103 with a portable security device 109, e.g., a smart card, connected thereto, to one or more remote servers 113. The host computer 103 is operated by a user 101 who interacts with one of the servers 113 via a web browser window 105 of a web browser. In the example scenario illustrated in FIG. 1, the smart card 109 provides the cryptographic operations on behalf of the user 101, e.g., to cryptographically sign documents, to encrypt messages to be transmitted to another party 13, to decrypt messages received from the other party 113, or to perform a cryptographic operation as part of a challenge-response authentication mechanism.

While FIG. 1 provides an illustration of a scenario in which cryptography may play an important role; there are many other important uses for cryptography. Thus, the technology described herein is not limited in its application to the use-case examples that are illustrated in FIG. 1.

Figure 2:
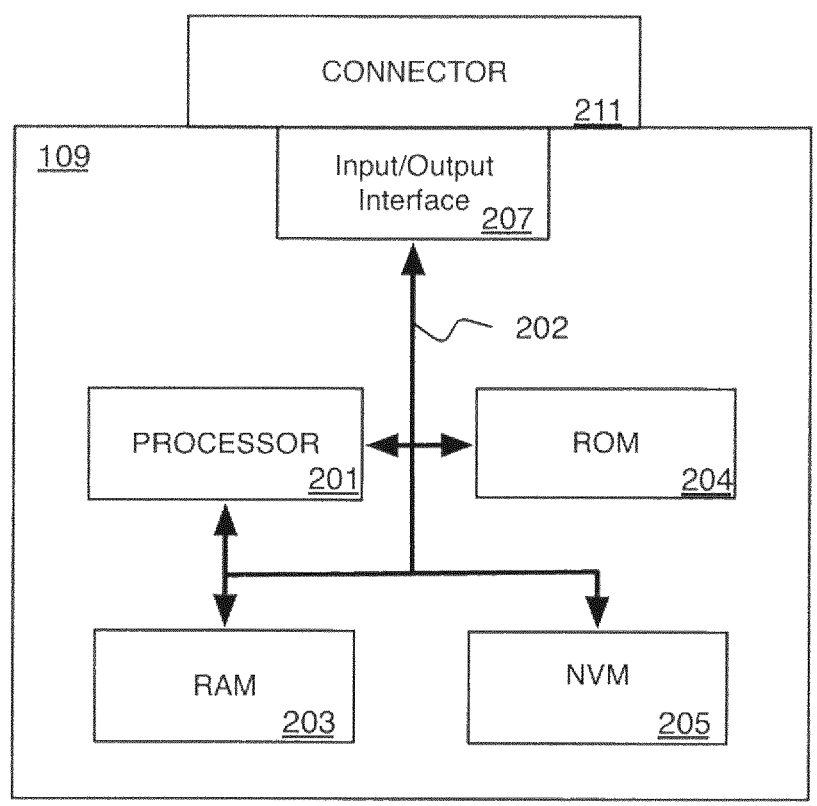
FIG. 2 is a schematic illustration of a portable security device.

FIG. 2 is a schematic illustration of a portable security device 109, for example, a smart card. The portable security device 109 may include a processor 201 connected via a bus 202 to a random access memory (RAM) 203, a read-only memory (ROM) 204, and a non-volatile memory (NVM) 205. The portable security device 109 further includes an input/output interface 207 for connecting the processor 201, again typically via the bus 202, to a connector 211 by which the portable security device 109 may be connected to the host computer 103.

In alternative embodiments, the connection between the host computer 103 and the portable security device 109 is wireless, for example, using near-field communication (NFC) or other radio or microwave communication technologies.

Figure 3:
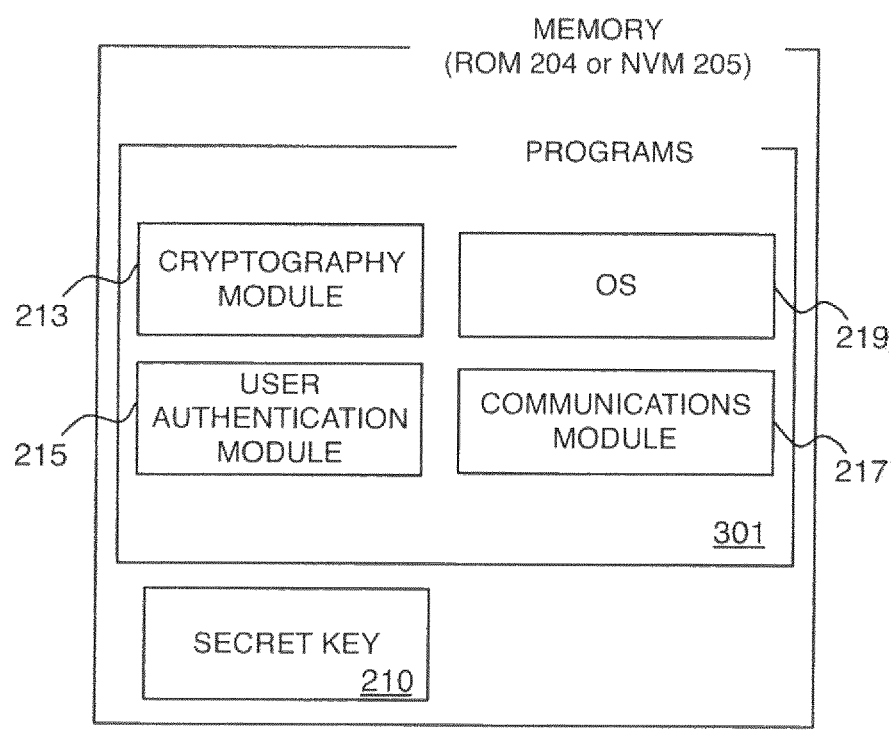
FIG. 3 is a schematic illustration of programs stored in a memory of the portable security device of FIG. 2.

The NVM 205 and/or ROM 204 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 may include multiple ROMs or NVMs. The programs 301 include operating system programs as well as application programs loaded onto the portable security device 109. The NVM 205 or ROM 204 may also contain private data, such as a shared secret key 210, stored either in its basic form or in derived quantities.

The portable security device 109 programs 301 may include a cryptography module 213, a user authentication module 215, a communications module 217, and the operating system OS 219.

Thus, the portable security device 109 may receive a document or message via the connector 211. The processor 201, by executing instructions of the cryptography module 213, may digitally sign the document/message or may decrypt the document/message using the shared secret key 210. Using functionality provided through the communications module 217, the processor 201 may receive and transmit communications with the host computer 103.

Figure 4:
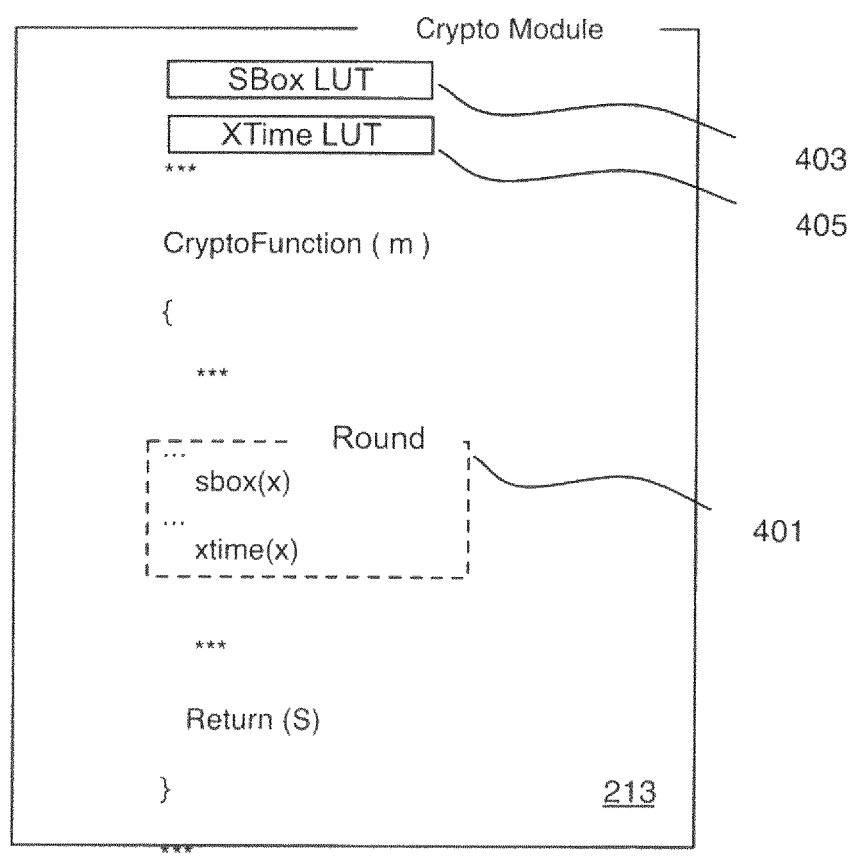
FIG. 4 is a schematic illustration of a prior art cryptography module program listing that may be stored in the memory of a portable security device as illustrated in FIG. 3 and which performs a encryption or decryption including non-linear operations.

FIG. 4 is a schematic of a prior art possible implementation of the cryptography module 213. The cryptography module 213 would contain one or more functions, methods, or routines. One possible function is illustrated in FIG. 4 as a function called CryptoFunction( ) which takes the argument M, the message to sign, encrypt, or decrypt. As an example, the cryptography function may implement the AES standard which includes a repeated Round function 401. The Round function 401 includes performance of the SubBytes (x) operation and the XTime(x) operation; the latter being part of a step called MixColumns. In this example, x is a byte of the current state where a state is a collection of intermediate values of the cryptography function.

To perform the SubBytes operation, the output value is obtained by retrieving it from a lookup table, here the SBox Lookup Table 403 using x as an index into the table. Similarly, the Xtime operation is performed by looking up the value from the XTime table 405.

AES is only used herein as an illustrative example. The techniques described herein may be applied to other cryptography technologies. Similarly, SubBytes and XTime, while advantageously implemented using lookup tables, are only example functions. The cryptographic operations, which may include SBox and XTime tables, are generically referred to herein as the operation f.

Figure 5:
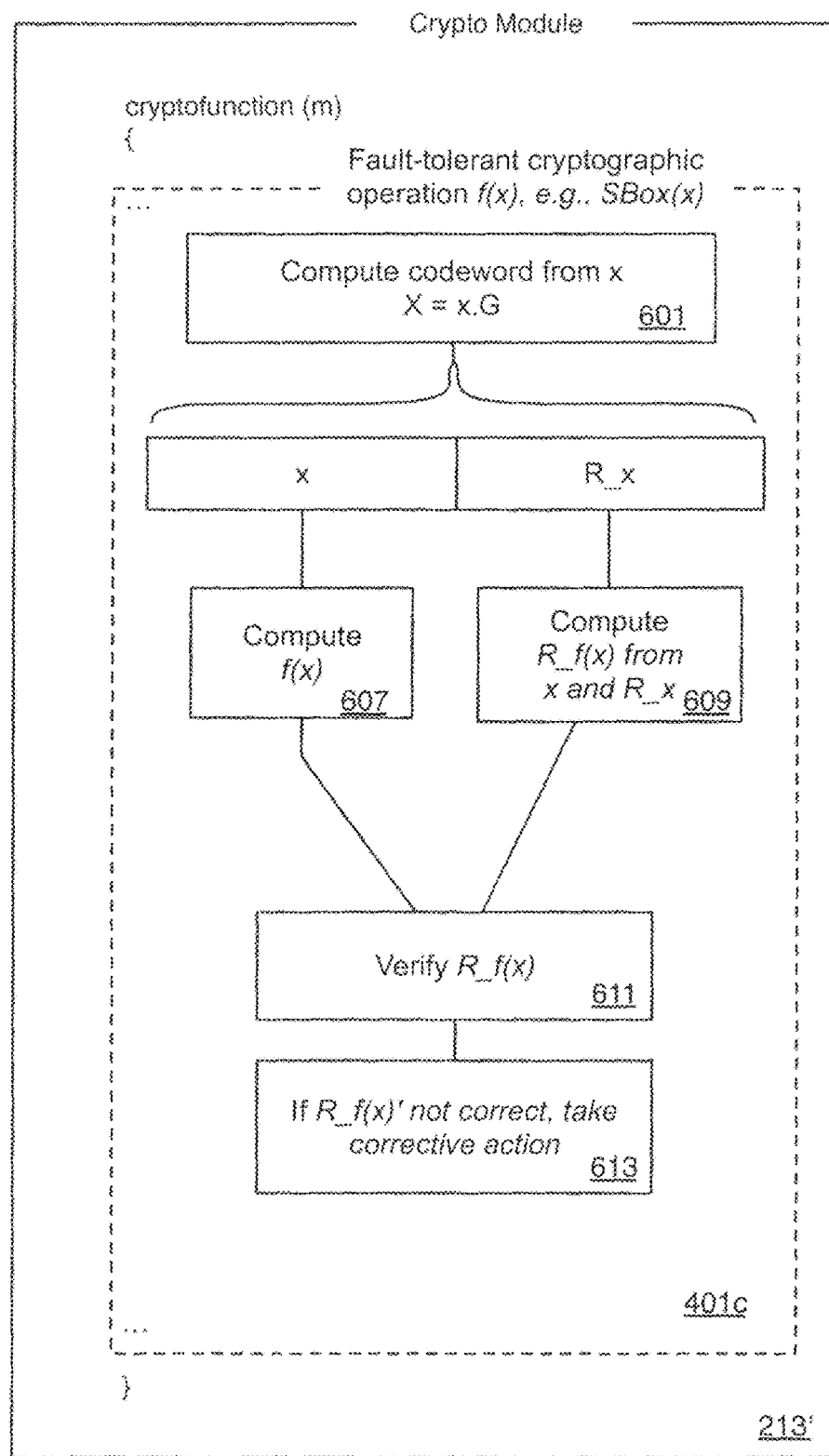
FIG. 5 is a schematic illustration of a fault-tolerant implementation of a cryptographic operation f(x), e.g., SubBytes or Xtime.
Figure 6:
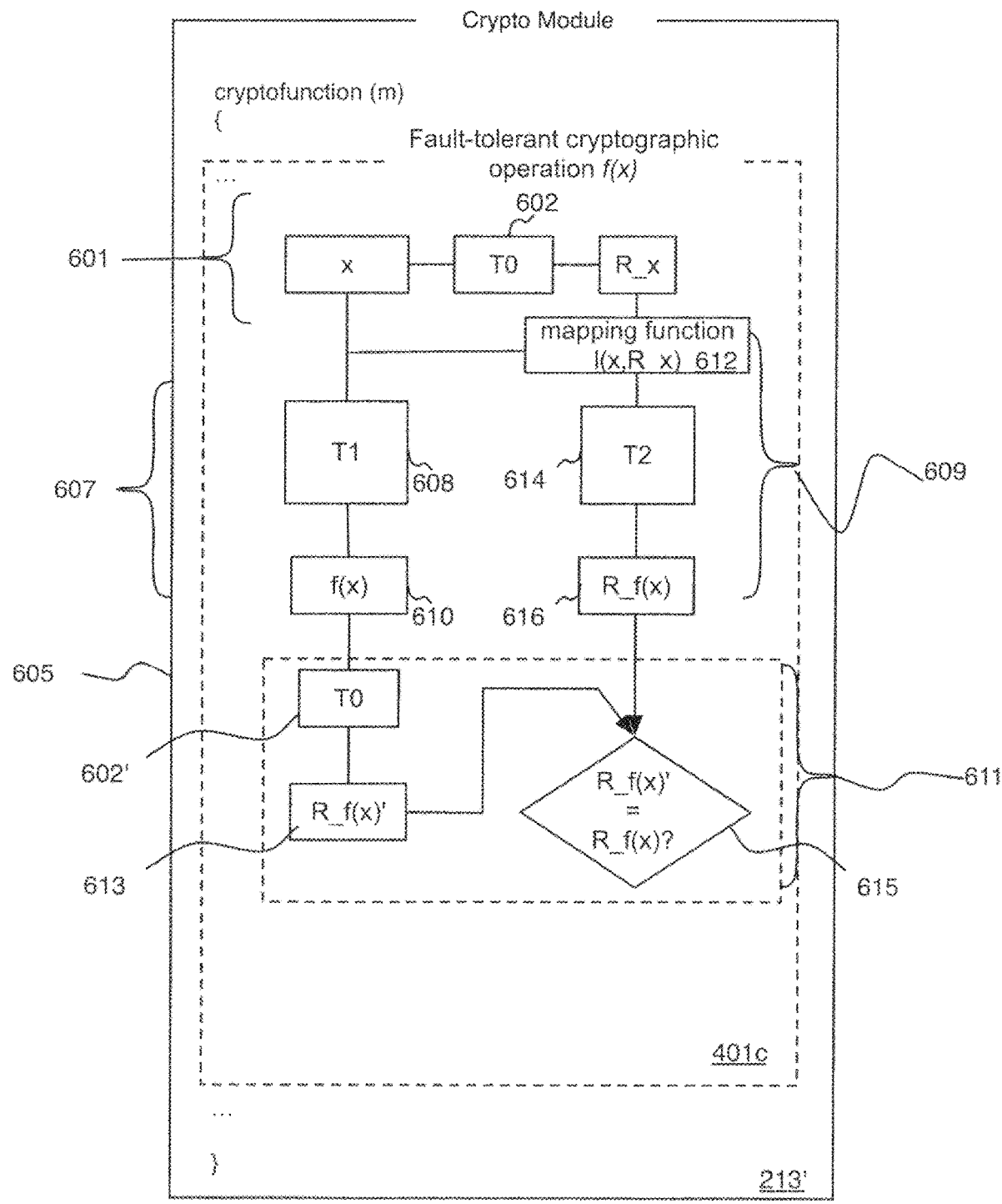
FIG. 6 is a schematic illustration of a preferred embodiment of the mechanism illustrated in FIG. 5.

FIG. 5 is a schematic illustration of a fault-tolerant implementation of a cryptographic operation f, e.g., SubBytes or XTime. FIG. 6, which is discussed herein in parallel with FIG. 5, illustrates a preferred embodiment in which the technique of FIG. 5 is implemented using lookup tables.

In a first step, a codeword X in a code C is computed from a byte x of the current cryptographic state, Step 601. Mathematically, let G be a generator matrix for the code C. Then, $X \leftarrow x.G$. The codeword X is composed of the systematic portion x and the redundancy portion R_x.

In a preferred embodiment, the technique is applied to a cipher that operates on states composed of a number of bytes (8 bits). The code to be used needs to have a dimension that is equal to 8. In a preferred embodiment, for example, in the application to AES, the length of the codeword produced is 16.

According to a preferred embodiment, a linear code is used to detect possible fault attacks against cryptographic operations, including AES operations.

For a systematic linear code C[n,k,d], G, the generator matrix, typically has the form [Id_k/R] where Id_k is a (k×k) identity matrix, and R is a (k×(n−k)) matrix that represents the redundancy part R_x of the codeword X. When applied to x as x.G, the result X is x/R_x.

In a preferred embodiment, illustrated in FIG. 6, Step 601 is performed using a lookup table T0, 602, with R_x being the result from the lookup operation. An example lookup table T0 is provided in FIG. 7.

In a preferred embodiment, the code is a C[16,8,5] error correcting code. The code encodes 1-byte input quantities, the produced codewords are 2-byte words, and the Hamming distance is at least 5. The example table 602 of FIG. 7 is a lookup table for the redundancy portion R_x of a C[16,8,5] code corresponding to the 8-bit systematic portion x. Thus indexes are bytes. Thus, there are 256 entries. The outputs are also 8-bit words. The high 8-bits of the codeword X is simply the systematic portion x and therefore does not need to be part of the table output. When concatenated as x|R_x, the codewords X are 16-bits.

Step 601, may be applied to every state byte to transform the state byte to a codeword in order to detect faults introduced into the state byte (or the corresponding redundancy portion).

Some faults in the codewords X may be detected by applying a parity check matrix H. For example, if the code C is a Hamming Code C[16, 8, 3], the distance d is equal to 3. That allows for fault detection of errors with a Hamming weight that is less than d, i.e., $HW(e) \leq d-1$, where e is the error and HW is the Hamming weight. In other words, an alteration of two bits may be detected; whereas alterations of more than two bits, a fault could change one codeword to another legal codeword and this cannot be detected.

The parity check matrix H for G is $[-R^T | Id\_n-k]$ where $R^T$ is the transpose of R and Id_n−k is the (n−k×n−k) identity matrix. Fault detection is performed by applying the parity check matrix H as follows. If X is a codeword, $X.H^T$ is equal to 0, where $H^T$ is the transpose of H. Then, above from Step 601, for the codeword X, if $X.H^T=0$, the codeword X is in C and is not corrupted or a fault in x or R_x has not been detected.

In any portion of the technology described herein where the codeword X is used, it may be verified using the parity check matrix. Alternatively, the codeword X=x|R_x may be verified as not corrupted by determining a check value, call it R_x', from the lookup table 602 and comparing that for the low bytes (R_x) in a codeword X, i.e., if R_x'=R_x, corruption of X has not been detected.

Given the value X=x|R_x, f(x) is computed conventionally, Step 607, producing the output f(x) 610. I.e., if f is a SubBytes or XTime operation, the operation may be performed using the SBox or XTime lookup tables defined in AES, FIG. 6, table 608.

A redundancy portion R_f(x), corresponding to the value f(x) is also computed, Step 609, from the systematic portion x (i.e., the input state byte x) and the redundancy portion R_x. The concept is to compute a redundancy portion corresponding to f(x), call it R_f(x), so that f(x) may be confirmed to not have been corrupted because a codeword f(x)|R_f(x) should also be in the code C.

It may not be possible to go directly from R_x to R_f(x) because for some linear codes two distinct values x1 and x2 could verify R_x1=R_x2. Most of the linear codes satisfy this property. In this case, an embodiment includes additional mappings, namely, a first (linear) mapping l of x and R_x such that for each two distinct values x1 and x2, l(x1, R_x1)≠l(x2, R_x2) and a second mapping from l(x, R_x) to R_f(x). This technique is discussed in greater detail herein below.

For example, if the code is a C[16,8,5], a table mapping the 16-bit quantity X (i.e., x|R_x) to f(x)|R_f(x) would be prohibitively large for many applications. Therefore, in a preferred embodiment, the systematic portion, f(x), is separated out from the redundancy portion R_f(x), and the result may be combined into f(x)|R_f(x). Each of these two calculations is performed separately using unique mappings. In the case of f(x), the mapping is simply the cryptographic non-linear operation f because by definition the operation f is such that for all x1≠x2, f(x1)≠f(x2). However, R_f(x) is not a uniquely defined by R_x. Therefore, to be able to compute R_f(x) requires additional input beyond R_x: R_f (x) is computed from x and R_x as inputs, Step 609.

That R_x is not uniquely defined by x, since depending on the choice of the code, one might have x1≠x2 and R_x1=R_x2 (in other words, the same redundancy for two different systematic part). This can be seen by examining, for example, the first and last elements of the example table of FIG. 7 (x1=0 and x2=255) in which the redundancy of both is the value 0x00. However, a function l may be defined such that for all x1≠x2 we have l(x1, R_x1)≠l(x2, R_x2). Therefore, in the embodiment of FIG. 6, Step 609 involves first computing the mapping l which is a function of x and R_x, i.e., l(x,R_x), Step 612. In one embodiment, l(x,R_x) is x XOR R_x. Choosing a linear function l enables taking advantage of the benefit of the error detection capability of the linear error correcting code.

In the embodiment of FIG. 6, the Step 609 next includes determining R_f(x) from the result l(x,R_x). In a preferred embodiment, l is implemented as a lookup table. The output of l (the value l(x,R_x)) is then used as input to the lookup table T2 614, thus, producing the result R_f(x) 616.

If at any time during the execution of the cryptographic function 401c, the quantity f(x) needs to be verified, the codeword f(x)|R_f(x) may be verified as belonging to the code C using the parity matrix H as discussed above, Step 611.

Alternatively, given the value f(x), it is possible to use table T0 602' (which is the same table as table 602) to determine the expected value of R_f(x). Thus the verification 611 may look up the expected value for R_f(x), call it R_f(x)' 613 from the table 602'. The value R_f(x)' may then be compared to R_f(x), Step 615. In other words, given a codeword X, it may be verified as belonging to the code C using the parity matrix H or it may be verified by determining if the systematic portion and the redundancy portion match as expected.

Conversely, if the codeword f(x)|R_f(x) is not verified as correct, the device may take action to thwart a threat from a potential fault attack, Step 613. The attack-thwarting action may include terminating the process, alerting the user of the cryptographic device that a fault has been detected, transmitting a warning message to an authorized entity, disabling device, etc.

While the verification Step 611 is illustrated here as following the computation steps, in actual implementations, the verification step may be applied at any point in the computation where a codeword X is being used as an input or an output to an operation. The verification operation is, for example, advantageously employed at the beginning or end of each AES round operation so as to verify that no fault injection has occurred during the previous operation or during the operation itself. Final results may also be verified.

Turning now to the generation of the tables T1 608 and T2 614.

As discussed, T1 is typically just an indexed collection of the outputs from the non-linear f operation. For example, the AES standard includes published values for the Sbox and XTime lookup tables.

I.e., T1 may be computed using the following pseudo-code:

loop i over all values of byte x
  T1[i]=f(i)

The computation of T2 is more involved. For all values of x, f(x) is computed. The redundancy portion of X, i.e., R_x, is computed from x, i.e., x.G. The linear mapping l(x,R_x) is computed. Then, f(x).G is computed to determine the corresponding redundancy portion R_f(x). The resulting value is stored in T2, indexed by l(x,R_x).

The following pseudocode may be used to compute T2:
loop i over all values of byte x
  compute R_i from i.G (or use the lookup table T0)
  compute indexValue=l(i,R_i)
  compute R_f(i)=f(i).G
  T2[indexValue]=R_f(i)

Figure 8:
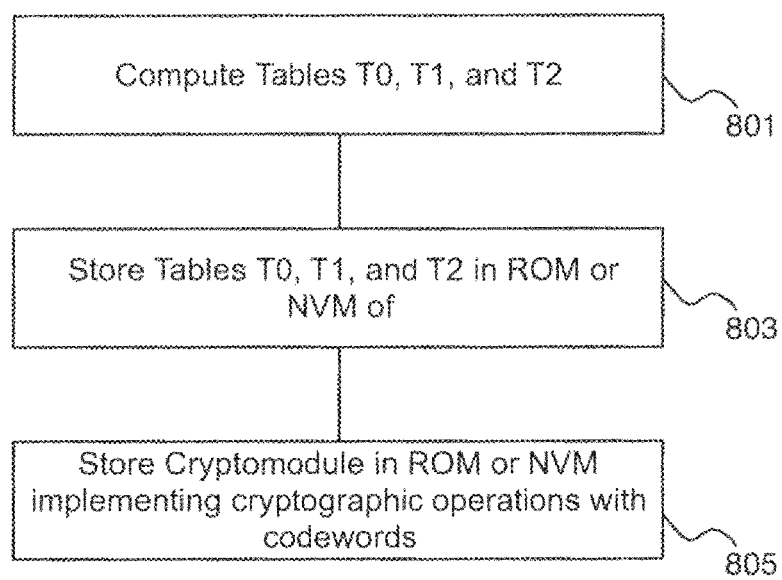
FIG. 8 illustrates high-level manufacturing steps for a secure device implementing the techniques illustrated in FIGS. 5 and 6.

To construct a cryptography device, which is illustrated at a high-level in FIG. 8, e.g., a secure device 109 as illustrated in FIGS. 1 and 2, according to the invention, the tables T0 602, T1 608 and T2 614 may be computed outside of the device on a manufacturing computer, step 801, and stored, step 803, for example, into ROM 204 or NVM 205 of the secure device 109 during the manufacturing phase of the device. Additionally, the program memory 301 would be loaded with instructions to perform the methods described herein above including the method of FIGS. 5 and 6, step 805.

Turning now to code modifications for implementing the technologies described hereinabove. Consider, for example, the AES encryption technology. AES operates on a 16 bytes state. According to the technology to protect cryptography devices from fault attacks as described herein, these state bytes are encoded into codewords, for example, as in a preferred embodiment, using the error correcting code C[16, 8,5] code. To operate on such codewords round operations are modified.

The encryption process may be implemented using the pseudocode listed in Appendix A.

Figure 9:
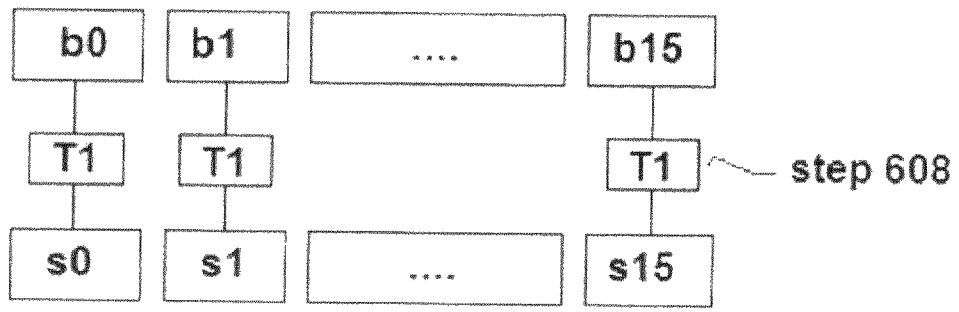
FIGS. 9 through 11 are block diagrams illustrating an implementation of the techniques of FIGS. 5 and 6 for AES.
Figure 10:
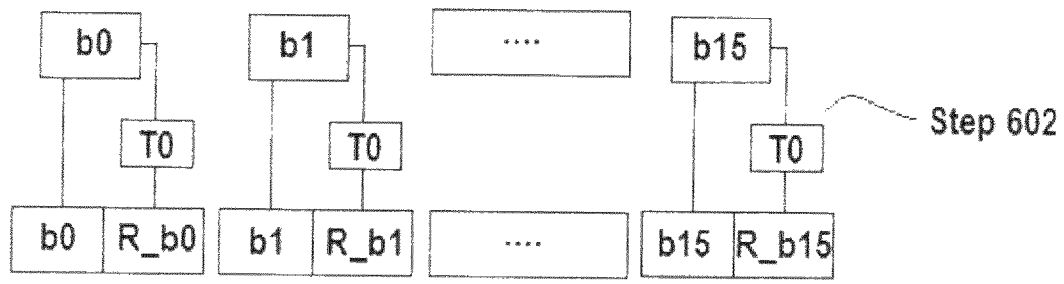

FIGS. 9 through 10 are block-diagrams illustrating an approach for implementing the SubBytes operation or the Xtime operation in AES using the herein described mechanism for protecting against fault attacks.

In FIG. 9, which illustrates the AES non-linear operation SubBytes or Xtime, for each byte bi (i=0 to 15) in the 16 byte AES state b0 . . . b15, each bi (loop i from 0 to 15) is transformed into si by applying the table T1 608. In the case of the SubBytes operation, an example of T1 is in this case known as the AES SBox. The following code illustrates the process of FIG. 9:

For all i from 0 to 15,
 si=T1[bi]

FIG. 10 illustrates a mechanism of transforming each byte of the AES state into a codeword in C. In the case of using the C[16,8,5] code, each byte (bi) of the 16 is transformed into a codeword. Because the generator matrix of this code can be written in a systematic form, the codeword has the form (bi|R_bi).

R_bi is obtained by applying table T0 602 with input bi. An example of table T0 602 corresponding to the code C[16,8,5] is given in FIG. 7. The following code illustrates the process of FIG. 10:

For all i from 0 to 15,
R_bi=T0[bi]
Construct codeword (bi|R_bi)

Figure 11:
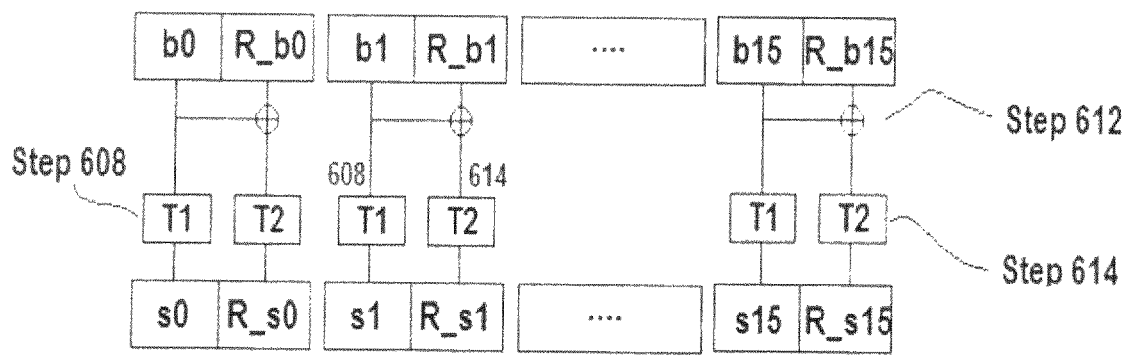

FIG. 11 is a block diagram illustrating a use case of the invention for an AES non-linear operation such as the SubBytes or the XTime. The input state is a 16-bit codeword that have the form (bi|R_bi) (i from 0 to 15). The systematic part of the output result (si) is obtained from the input bi using table T1 608. This is the same operation f (e.g., SubBytes or XTime) as in the standard AES process using a 16-byte input state. Step 1 in the pseudo code, immediately herein below.

For the redundancy part of the output (R_si), the mapping l 612 is used. In case of a code C[16,8,5], one possible choice for the mapping l is a xor operation between the systematic part bi and the redundancy R_bi. The output result is l(bi, R_bi). This will be the index input of table T2 614 (Step 2 in pseudo code below). The output of this table is the redundancy part (Step 3 in pseudo code below). The following code illustrates the process of FIG. 11:

For all l from 0 to 15,
1. si=T1[bi]
2. Index_i=l(bi, R_bi)
3. R_si=T2[Index_i]
4. Construct codeword (si|R_si)

FIG. 12 provides an example of the table T2 614 corresponding to the AES SubBytes operation for the non-linear operation f, the XOR operation for the mapping l and the error correcting code C[16,8,5].

Now turning to how the herein-described technology allows for error detection, for example, errors introduced during fault attacks.

In the context of the use case examples provided in FIG. 9 through 11 and the pseudo code in the accompanying description, the following pseudocode provides for test for the consistency of the input and output of any operation, regardless of being a linear or non-linear operation:

For all l from 0 to 15,
Test if R_bi is equal to T0[bi] for input

Additionally or alternatively the verification test may be performed on the output by:

For all l from 0 to 15,
Test if R_si is equal to T0[si] for output

An error correcting code C[16,8,5], allows the detection of errors with a Hamming weight up (d−1)=4 (d is the Hamming distance; in this case, 5). Consider the cryptographic operation of FIG. 6. In a first case scenario, before the mapping l 612, for example, just before a call to the SubBytes or MixColumns operation, illustrated in FIG. 13, a fault e is introduced into the 16-bit codeword X=(x|R_x). The error e is written as the concatenation of two errors e1 and e2: e1 modifying the systematic part and e2 modifying the redundancy portion. Provided that the new codeword, i.e., incorporating the injected error into x or R_x, is not a valid codeword in C the error is detected which would, by definition, be the case so long as the error has a Hamming weight strictly less than 5.

The same result is obtained from the following method. Suppose the codeword (x|R_x), i.e., a correct codeword based on x. The detection capability is given by the verification: T0_C_16_8_5[x]==R_x (right part) where T0_C_16_8_5 is the table T0 602 for looking up the redundancy portion R_x from a given x. With the fault injection, instead of the codeword (x|R_x) the given fault injection results in a 16-bit word ((x^e1)|(R_x^e2)). The faults would remain undetected as a valid codeword, if R_(x^e1) is equal to (R_x^e2). This means that, before applying the T1 and T2 tables, the faults would be undetected if:

(R_x^e2)=R_(x^e1)
(R_x"e2)=R_x^R_e1 (linear code)

Simplifying with (R_x), result is: e2=R_e1, the condition to be verified in order not to detect a fault. Conversely, if e2≠R_e1, the fault would be detected.

Consider a second scenario, illustrated in FIG. 14, in which a fault is introduced after the mapping l 612; this means that the indexes of the tables are faulted (in this case, T1 is the SBox table and T2 is the table that maps the output of the linear mapping l to the redundancy portion corresponding to SBox(x)).

Suppose that a fault e1 is injected to x after its value is used for XOR 612 (is used as an example) and a fault e2 modifies the result of the xor ((x^R_x)^e2). In order for the faults to be undetected, the following should hold:

(x^R_x)^e2=R_(x^e1)^x^e1
 ⇨ e2=R_e1^e1

Note that if the Hamming weight of the result e=z.Ht is less or equal to (d−1) it is possible to detect the error. Furthermore, if Hamming weight of the result is less than (d−1)/2 the error can be corrected. For example, with the code C[16, 8, 5], if the codeword is faulty and two bits have been flipped, xoring codeword with the corresponding row of the generator matrix corrects the error. For example, if e=10000100, than xor row 1 and 6 of matrix G to the faulty codeword to correct.

From the foregoing it is evident that a mechanism is presented herein that provides an efficient countermeasure to fault attacks by using linear error correcting code codes to protect cryptography values during performance of cryptography operations thereby protecting against detection of the key material used in encryption and decryption operations.

The above-described mechanism has been described in the context of the AES encryption standard. The mechanism is readily adapted to other cryptography techniques.

Although specific embodiments of the invention have been described and illustrated, the invention is not to be limited to the specific forms or arrangements of parts so described and illustrated. The invention is limited only by the claims.

The invention claimed is:

1. A cryptography device protected from fault attacks while performing a cryptographic operation f, comprising:
   a memory, a hardware processor and instruction storage storing instruction executable by the hardware processor to perform cryptography operations, the instructions including—instructions to generate a codeword cw in a code C from an input quantity x wherein the codeword comprises a systematic portion equal to the quantity x and a redundancy portion R x derived from the quantity x using a first redundancy-portion mapping function;
   instructions to determine f(x) from x using a cryptography-operation mapping function;
   instructions to determine a unique index value using a linear index-value mapping that uniquely maps the combination of the systematic portion x and the redundancy portion R x to said unique index value;
   instructions to compute a second redundancy portion R f(x) as a function of the unique index value wherein the combination of f(x) and the second redundancy portion is a codeword in C corresponding to f(x) using a second redundancy-portion mapping function;
   instructions to verify, the absence of a fault in the computation off by verifying the second redundancy portion (R f(x)) against an expected value for the second redundancy portion;
   and in response to detecting a fault by determining a mismatch between the second redundancy portion and the expected value for the second redundancy portion, taking a corrective action to thwart a threat from a potential fault attack.

2. The cryptography device of claim 1, wherein at least one of the codeword cw, the value f(x), the index value uniquely corresponding to the combination of the systematic portion x and the redundancy portion R_x, or the second redundancy portion is determined using lookup table.

3. The cryptography device of claim 2, wherein the lookup table for determining at least one of the codeword cw, the value f(x), the index value uniquely corresponding to the combination of the systematic portion x and the redundancy portion R_x, or the second redundancy portion is determined using lookup table is stored in permanent storage of the cryptography device.

4. The cryptography device of claim 1, wherein the unique index value is a function (l) that is a mapping of inputs x and R_x such that l(x,R_x) determines uniquely x and the instructions to compute a second redundancy portion comprises computing R_f(x) using a mapping of l(x,R_x) to R_f(x).

5. The cryptography device to claim 1, wherein f is a nonlinear operation in a cryptographic operation.

6. The cryptography device to claim 5, wherein the cryptography non-linear operation is an operation on a cryptography state word.

7. The cryptography device to claim 1, wherein the second mapping function is defined such that given as input the output of the index-value mapping the second redundancy-portion mapping function produces the same output as the first redundancy-portion mapping function produces using the output from the cryptography-operation mapping; and
   wherein instructions to verify the absence of a fault in the computation of f by verifying the second redundancy portion against an expected value for the second redundancy portion comprises computing a verification value for the redundancy portion based solely on f(x) (R_f(x)') and comparing the verification value for the redundancy portion against the second redundancy portion computed as a function of the unique index value (R_f(x)).

8. The cryptography device to claim 1, wherein instructions to verify the absence of a fault in the computation of f by verifying the second redundancy portion against an expected value for the second redundancy portion comprises computing by determining that a codeword composed of a systematic portion f(x) and the second redundancy portion is a valid codeword in C.

9. A method for operating a cryptography device having a processor and instruction storage, the method protecting the cryptography device against fault attacks, the device operable to perform a cryptographic operation f on an input quantity x of a cryptographic process, the input quantity not represented in plaintext and protected against fault attacks, the method comprising:
   generating a codeword cw in a code C from an input quantity x wherein the codeword comprises a systematic portion equal to the quantity x and a redundancy portion R_x derived from the quantity x using a first redundancy-portion mapping function;
   determining f(x) from x using a cryptography-operation mapping function;
   determining a unique index value using a linear index-value mapping that uniquely maps the combination of the systematic portion x and the redundancy portion R_x to said unique index value;
   computing a second redundancy portion R_f(x) as a function of the unique index value wherein the combination of f(x) and the second redundancy portion is a codeword in C corresponding to f(x) using a second redundancy-portion mapping function; and
   verifying the absence of a fault in the computation of f by verifying the second redundancy portion (R_f(x)) against an expected value for the second redundancy portion; and
   in response to detecting a fault by determining a mismatch between the second redundancy portion and the expected value for the second redundancy portion, taking a corrective action to thwart a threat from a potential fault attack.

10. The method for operating a cryptography device having a processor and instruction storage of claim 9, wherein at least one of the generating a codeword cw, determining the value f(x) from x, the determining the index value uniquely corresponding to the combination of the systematic portion x and the redundancy portion R_x, or the determining the second redundancy portion is determined using lookup table.

11. The method for operating a cryptography device having a processor and instruction storage of claim 10, wherein the lookup table for determining at least one of the codeword cw, the value f(x), the index value uniquely corresponding to the combination of the systematic portion x and the redundancy portion R_x, or the second redundancy portion is determined using lookup table is stored in permanent storage of the cryptography device.

12. The method for operating a cryptography device having a processor and instruction storage of claim 9, wherein the unique index value is a function (l) that is a mapping of inputs x and R_x such that l(x,R_x) determines uniquely x and the instructions to compute a second redundancy portion comprises computing R_f(x) using a mapping of l(x,R_x) to R_f(x).

13. The method for operating a cryptography device having a processor and instruction storage of claim 9, wherein f is a non-linear operation in a cryptographic operation.

14. The method for operating a cryptography device having a processor and instruction storage of claim 9, wherein the second mapping function is defined such that given as input the output of the index-value mapping the second redundancy-portion mapping function produces the same output as the first redundancy-portion mapping function produces using the output from the cryptography-operation mapping; and wherein verifying the absence of a fault in the computation of f by verifying the second redundancy portion against an expected value for the second redundancy portion comprises computing a verification value for the redundancy portion based solely on f(x) (R_f(x)') and comparing the verification value for the redundancy portion against the second redundancy portion computed as a function of the unique index value (R_f(x)).

15. The method for operating a cryptography device having a processor and instruction storage of claim 9, wherein verifying the absence of a fault in the computation of f by verifying the second redundancy portion against an expected value for the second redundancy portion comprises computing by determining that a codeword composed of a systematic portion f(x) and the second redundancy portion is a valid codeword in C.

16. The cryptography device of claim 2, wherein the unique index value is a function (l) that is a mapping of inputs x and R_x such that l(x,R_x) determines uniquely x and the instructions to compute a second redundancy portion comprises computing R_f(x) using a mapping of l(x,R_x) to R_f(x).

17. The cryptography device of claim 3, wherein the unique index value is a function (l) that is a mapping of inputs x and R_x such that l(x,R_x) determines uniquely x and the instructions to compute a second redundancy portion comprises computing R_f(x) using a mapping of l(x,R_x) to R_f(x).

18. The cryptography device to of claim 2, wherein f is a nonlinear operation in a cryptographic operation.

19. The cryptography device to of claim 3, wherein f is a nonlinear operation in a cryptographic operation.

20. The cryptography device to of claim 4, wherein f is a nonlinear operation in a cryptographic operation.

* * * * *